United States Patent
Zak et al.

[11] Patent Number: 6,084,926
[45] Date of Patent: Jul. 4, 2000

[54] METHOD AND SYSTEM FOR DEMODULATING RADIO SIGNALS

[75] Inventors: Robert A. Zak, Apex; George W. Kellam, Hillsborough, both of N.C.

[73] Assignee: Ericsson Inc., Research Triangle Park, N.C.

[21] Appl. No.: 08/986,436

[22] Filed: Dec. 8, 1997

[51] Int. Cl.[7] ........................................ H03D 1/00
[52] U.S. Cl. .................... 375/341; 375/232; 375/330; 714/794; 714/795
[58] Field of Search ........................... 375/229, 232, 375/262, 265, 328, 330, 341, 348; 904/214, 226, 233, 242; 455/65; 714/794, 795

[56] References Cited

U.S. PATENT DOCUMENTS

| | | | |
|---|---|---|---|
| 5,113,400 | 5/1992 | Gould et al. | 371/43 |
| 5,230,077 | 7/1993 | Raith | 455/65 |
| 5,283,531 | 2/1994 | Serizawa et al. | 329/316 |
| 5,602,484 | 2/1997 | Suzuki et al. | 324/647 |
| 5,805,638 | 9/1998 | Liew | 375/231 |
| 5,809,071 | 9/1998 | Kobayashi et al. | 375/229 |
| 5,818,876 | 10/1998 | Love | 375/341 |
| 5,907,586 | 5/1999 | Katsuragawa et al. | 375/341 |
| 5,918,204 | 6/1999 | Tsurumaru | 704/214 |
| 5,949,796 | 9/1999 | Kumar | 370/529 |
| 6,005,894 | 12/1999 | Kumar | 375/270 |

FOREIGN PATENT DOCUMENTS

| | | |
|---|---|---|
| 0 415 897 A1 | 3/1991 | European Pat. Off. . |
| 0 594 551 A1 | 4/1994 | European Pat. Off. . |
| 0 615 347 A1 | 9/1994 | European Pat. Off. . |
| 0 674 398 A1 | 9/1995 | European Pat. Off. . |
| PCT/US 98/25958 | 3/1999 | WIPO . |

OTHER PUBLICATIONS

Application for United States Letters Patent (S/N: 08/897,309 FD: Jul. 21, 1997) Systems and Methods for Selecting An Appropriate Detection Technique in a Radio Communication System by Gregory E. Bottomley, Jyun–Cheng Chen and R. David Koilpillai; pp. 1–16, Drawing Figures 1–8.

*Primary Examiner*—Stephen Chin
*Assistant Examiner*—Chieh M. Fan
*Attorney, Agent, or Firm*—Jenkens & Gilchrist, P.C.

[57] ABSTRACT

A multi-path demodulator is provided for a mobile radio-telephone that includes a maximum likelihood sequence estimator in parallel with a symbol-by-symbol detector to demodulate the received signals. In a preferred embodiment, an adaptive equalizer is used in a dual-path demodulator in parallel with a differential detector. As each frame of data is demodulated, a determination is made from channel decoder information from each path about which demodulated bit stream to use (e.g., from either the estimator or detector). The performance of the demodulator is thus optimized for both non-time-dispersive and time-dispersive radio signals.

30 Claims, 5 Drawing Sheets

METHOD AND SYSTEM FOR DEMODULATING RADIO SIGNALS

BACKGROUND OF THE INVENTION

1. Technical Field of the Invention

The present invention relates in general to the radio communications field and, in particular, to a method and system for demodulating radio signals.

2. Description of Related Art

In the digital mobile radio communications field, time dispersion is a disturbing effect which is caused when a transmitted radio signal reflects off a distant object and arrives at a receiver out of phase with the original transmitted signal. More specifically, time dispersion causes what is known as Inter-Symbol Interference (ISI), which means that consecutive symbols in the transmitted signals interfere with one another. Consequently, ISI makes it more difficult for a receiver to determine which symbol actually has been detected (or actually was sent). For example, in the digital cellular Global System for Mobile Communications (GSM), the time duration of one bit corresponds to a distance of 1.1 km. Therefore, a signal reflection from 1 km behind a receiving mobile station will have a 2 km longer path than that of the directly received signal. At the receiver, this reflection mixes the desired signal with the reflected signal (which has been delayed for a two-bit duration). In other words, the incoming bits are spread out in time at the receiver, and the adjacent bits interfere with each other. Consequently, time dispersion makes it more difficult for the receiver to determine precisely what information has been transmitted.

An existing solution for the time dispersion problem is to use an adaptive equalizer at the receiver to create a mathematical model of the transmission channel and to calculate based on the model the most probable transmitted data. In the case of the GSM and other digital cellular systems (e.g., Digital-Advanced Mobile Phone System or D-AMPS), the transmission channel is a radio air interface.

A problem with the use of an adaptive equalizer for signal demodulation is that not all radio channels are time-dispersive. Adaptive equalizers are not optimized for "flat" or non-time-dispersive radio channels. As such, the use of an adaptive equalizer for "flat" radio channels can actually be inferior to other demodulation approaches (e.g., differential detection). As described below, the present invention successfully resolves this problem.

SUMMARY OF THE INVENTION

It is, therefore, an object of the present invention to provide a method and apparatus for efficiently demodulating both flat and time-dispersive digital radio signals.

It is another object of the present invention to optimize the demodulation of flat and time-dispersive radio channels in a single receiver.

In accordance with the present invention, the foregoing and other objects are achieved by a multi-path demodulator for use in a mobile radiotelephone. In a preferred embodiment, a dual-path demodulator is provided that includes an adaptive equalizer in parallel with a differential detector to demodulate the received signals. As each frame of data is demodulated, a determination is made from channel decoder information about which demodulated bit stream to use (e.g., from either the adaptive equalizer or differential detector). The performance of the demodulator is thus optimized for both flat and time-dispersive radio signals.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, a multi-path demodulator is provided for a mobile radiotelephone that includes a plurality of signal detectors and/or estimators connected in parallel. In a preferred embodiment, a dual-path demodulator has an adaptive equalizer connected in parallel with a differential detector to demodulate the received signals. As each frame of data is demodulated, a determination is made from channel decoder Forward Error Correction (FEC) or Cyclic Redundancy Check (CRC) information about which demodulated bit stream to use (e.g., from either the adaptive equalizer or differential detector). The demodulator is thus optimized for both flat and time-dispersive radio signals.

Figure 1:
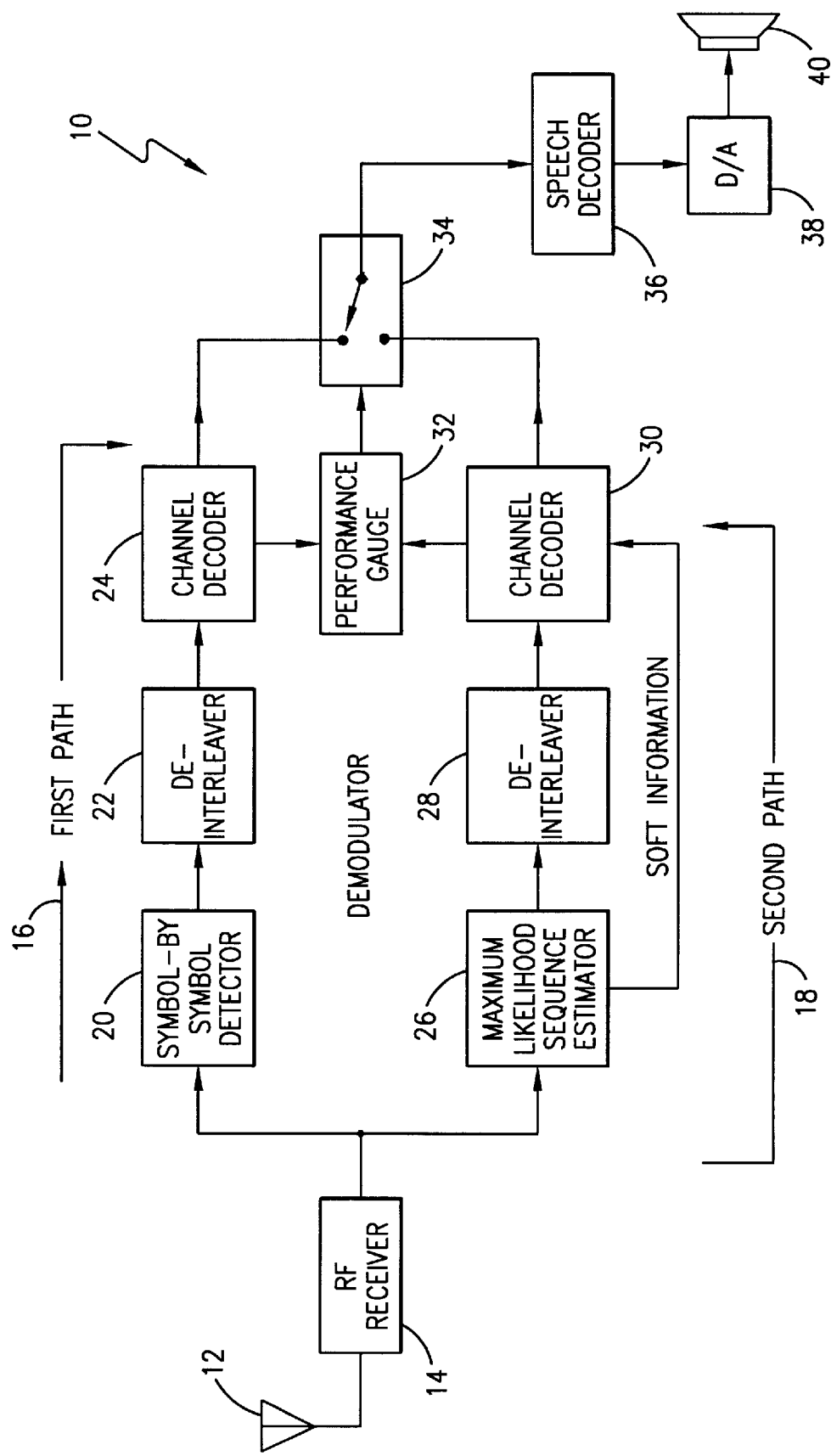
FIG. 1 is a block diagram of a mobile receiver that includes a multi-path demodulator, which can be used to implement one or more embodiments of the present invention.

Specifically, FIG. 1 is a block diagram of a receiver that includes a multi-path demodulator, which can be used to implement one or more embodiments of the present invention. In FIG. 1, a receiver 10 including a dual-path demodulator is shown, but this is for illustrative purposes only and it should be understood that the invention can also cover a demodulator with more than two parallel demodulation paths. Preferably, receiver 10 is a digital or analog/digital mobile terminal receiver that includes a conventional antenna 12 and radio frequency (RF) receiver front end section 14. In the embodiment shown, the preferable modulation scheme used is a non-constant envelope Differential Quadrature Phase Shift Keying (Dapsk) modulation scheme, as it is implemented in the DAMPS or the Pacific Digital Cellular (PDC) System in Japan. However, the invention is not intended to be limited to a particular modulation scheme. For example, the invention can also be implemented in the GSM, which uses a constant envelope Gaussian Minimum Shift Keying (GMSK) modulation scheme.

An output of the RF receiver front end section 14 is coupled to a respective input of a pair of parallel demodulation channels, shown as a first demodulation path 16 and second demodulation path 18. As mentioned earlier, the invention is not intended to be limited only to two parallel demodulation channels and can include more than two parallel demodulation channels. Generally, the first demodulation path 16 can include a symbol-by-symbol detector 20. In other words, each received symbol is detected and processed. As known by those skilled in the art, the efficiency of a symbol-by-symbol detector 20 is relatively high in a non-time-dispersive channel with little or no delay spread. In the exemplary embodiment shown, detector 20 is preferably a differential detector. Such a differential detector 20 is optimized for demodulating flat or non-time-dispersive radio signals with differential phase modulation.

The second demodulation path 18 includes a maximum likelihood sequence estimator (MLSE) 26. The MLSE 26 is preferably an equalizer that uses a channel impulse response simulator (in an algorithm) to test all possible data sequences, as opposed to detecting each received symbol. The output of the MLSE 26 provides the data sequence with the maximum probability. In the embodiment shown, MLSE 26 is preferably a Viterbi equalizer. Such an equalizer 26 is optimized for demodulating time-dispersive radio signals.

An output of detector 20 is coupled to an input of a first de-interleaver 22. During the coding of a signal to be transmitted, interleaving is used to distribute the effects of burst errors. Essentially, the bits for a given block of code are spread out in time by interleaving those bits with bits in other blocks of code. The de-interleaver 22 reverses the interleaving process on the decoding side, so that the interleaved bits are extracted and rearranged for decoding in their original bit sequence. Although the de-interleaver 22 is shown in FIG. 1, the invention is not intended to be so limited. Essentially, a de-interleaver is preferably used in such a demodulator when the transmitted signal has been interleaved.

An output of de-interleaver 22 is coupled to an input of a first channel decoder 24. In the embodiment shown, channel decoder 24 is preferably a convolutional decoder with an error correction capability. An output of channel decoder 24 is coupled to an input of a switch 34 and comprises the information bits (e.g., speech or data) which were decoded by path 16.

Returning to the second path 18, the "hard bit" and (optionally) "soft bit" information output from estimator 26 is coupled to an input of a second de-interleaver 28. The "hard bit" (and "soft bit") information from the second de-interleaver 28 is coupled to an input of channel decoder 30. An output of channel decoder 30 is coupled to a second input of switch 34 and comprises the information bits (e.g., speech or data) received and decoded in path 18. More specifically, the outputs of both symbol-by-symbol detector 20 and estimator 26 comprise "hard bits" (1's and 0's) and (optionally) "soft" information. The "soft" information, which (if used) is "tagged" to the "hard bits", comprises a number that indicates the reliability or confidence level of the "hard bit" decisions. The detector 20 and estimator 26 determine the "soft" information, which is used to increase the efficiency of the channel decoding process.

A second output of each of channel decoders 24 and 30 is coupled to a respective input of a "performance gauge" 32. The performance gauge 32 (preferably implemented by software operating in a digital signal processor) functions to measure and compare the efficiencies of the demodulation processes of paths 16 and 18. An output of performance gauge 32 is coupled to a control input of switch 34 (e.g., an electronic switch or software switching function). In the preferred embodiment, detectors 20 and 26, de-interleavers 22 and 28, channel decoders 24 and 30, performance gauge 32, and switch 34 can be implemented in one or more digital signal processors. Performance gauge 32 selects the best demodulation bit stream to use (e.g., first path 16 or second path 18) for the particular channel conditions present at the time. The inputs to performance gauge 32 from a channel decoder can be, for example, a bit error rate (BER) estimate or a pass/fail indication resulting from a CRC for each frame being demodulated.

In operation, a digital RF signal to be demodulated is received (12, 14) and input to each detector (20, 26). In the preferred embodiment, for path 18 a digital signal processor performs Viterbi equalization (26), de-interleaving (28) of the detected bit stream, and channel decoding (30). For path 16, a digital signal processor also performs differential detection (20), de-interleaving (22), and channel decoding (24) of the detected bit stream. Performance gauge 32 analyzes the respective outputs of the channel decoders (24, 30), which represent efficiency measurements of the respective decoding processes. Each such efficiency measurement can be the result of a CRC over all or a part of the data being decoded at a particular time, or a BER measurement of that data. The performance gauge 32 selects the most efficient bit stream as an output from the switch 34, which routes the output bit stream to a speech decoder 36 (or to a visual display for data). The digital speech information (bit stream) is converted to an analog signal (38) and output via a speaker 40. Preferably, the efficiency measurement used for the performance gauge selection is computed for a specific time interval (e.g., a time division multiple access or TDMA slot for a mobile telephone).

In the preferred embodiment, the performance gauge 32 can use one or more of a number of different performance criteria to select a demodulated bit stream to output for a particular time slot or "frame". During each such "frame" of data, which also contains FEC information and/or CRC information, the performance gauge 32 uses this information to decide whether to select the demodulated bits from the output of path 16 or path 18. The following selection criteria can be used by performance gauge 32 to make these decisions.

Figure 2:
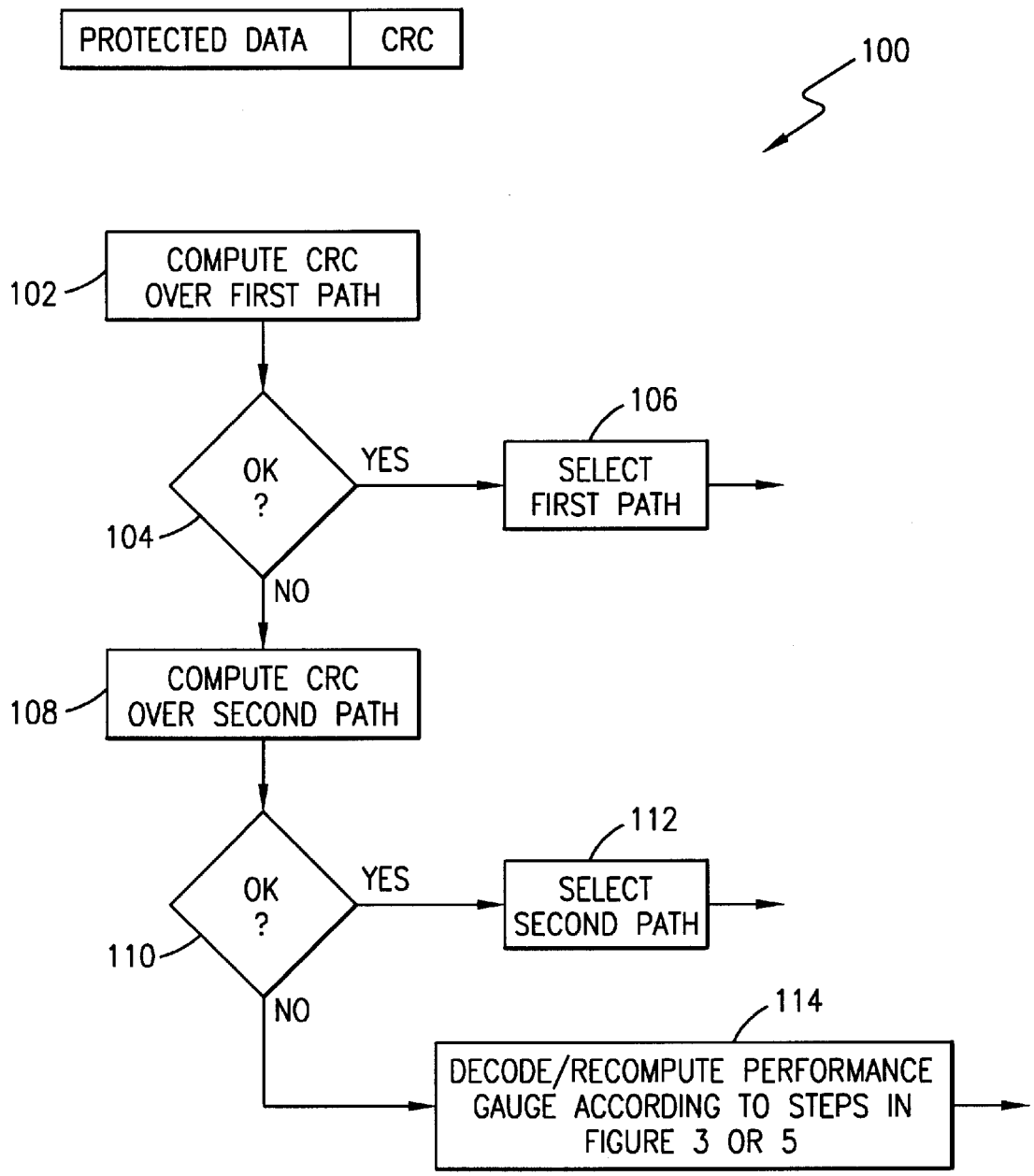
FIG. 2 is a flow chart that illustrates a preferred criteria and method of selecting demodulated data, which can be implemented in accordance with a first embodiment of the present invention.

FIG. 2 is a flow chart that illustrates a preferred criteria and method of selecting demodulated data (bits), which can be implemented by the performance gauge 32 in FIG. 1, in accordance with a first embodiment of the present invention. At step 102 of method 100, the channel decoder 24 computes a CRC for the first path (16) for a "frame". At step 104, if the computed CRC finds either no errors or a number that is less than a preselected error threshold ("correct"), then at step 106, the performance gauge 32 outputs control information to enable switch 34 to select the first path (16) bit stream as an output to the speech decoder 36. The first path selected is optimized for flat or non-time-dispersive radio signals.

However, returning to step 104, if the first computed CRC finds errors ("incorrect") for that "frame", then at step 108, a CRC is computed for the second path (18) for that frame. At step 110, if the second computed CRC is "correct", then at step 112, the performance gauge 32 outputs control information for switch 34 to select the second path (18) as an output to the speech decoder 36. The second path selected is optimized for time-dispersive radio signals. Otherwise, at step 114 (and as described below), another set of selection criteria or selection method can be used.

Figure 3:
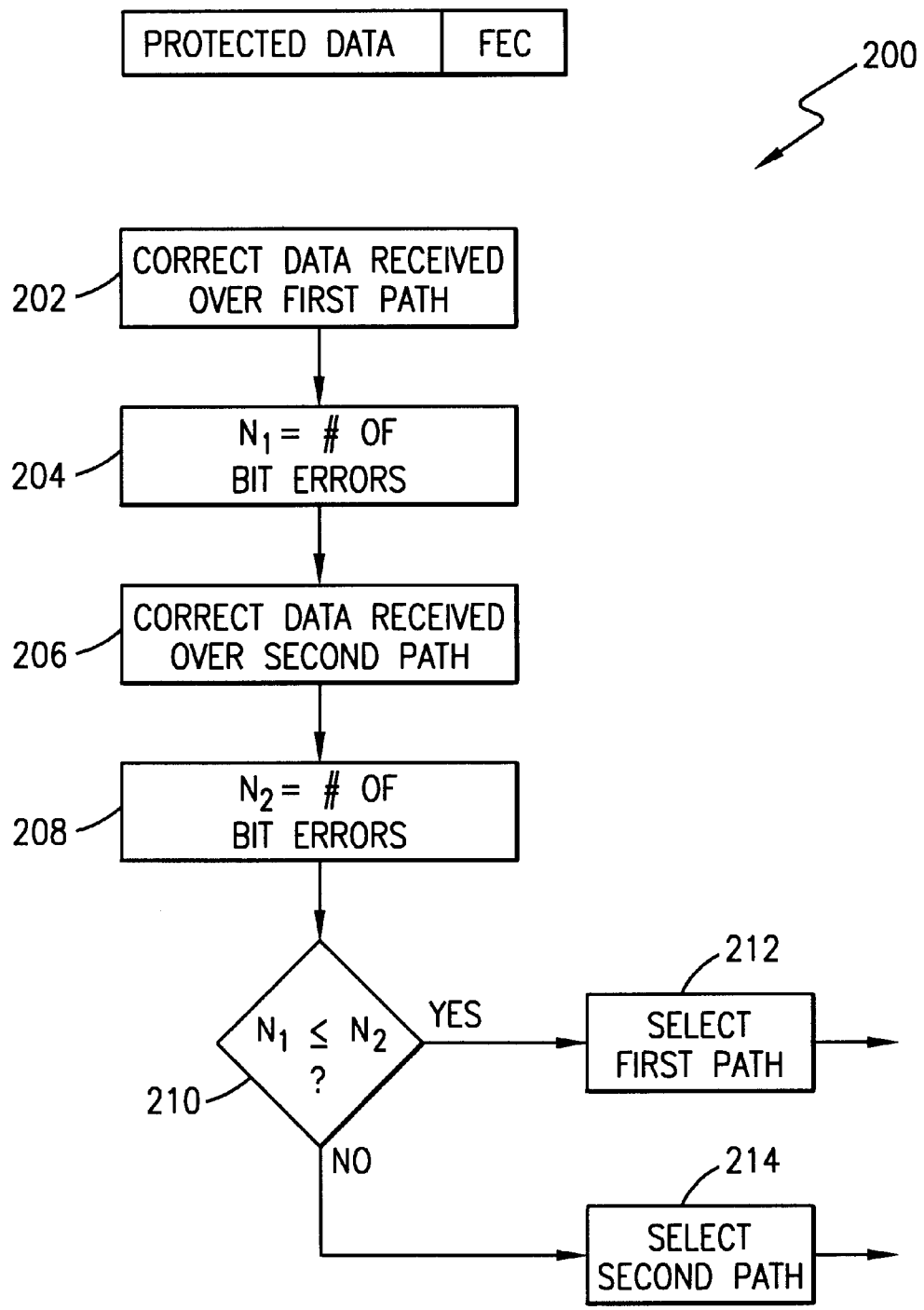
FIG. 3 is a flow chart that illustrates a preferred criteria and method of selecting demodulated data, which can be implemented in accordance with a second embodiment of the present invention.

FIG. 3 is a flow chart that illustrates a preferred criteria and method of selecting demodulated bits, which can be implemented by the performance gauge 32 in FIG. 1, in accordance with a second embodiment of the present invention. At step 202 of method 200, channel decoder 24 performs error corrections (preferably using FEC) for data errors in the bit stream for the first path 16. At step 204, the number of bit errors ($N_1$) found in step 202 are stored in a memory location associated with the digital signal processor. At step 206, channel decoder 30 performs error corrections (preferably using FEC) for data errors in the bit stream for the second path 18. At step 208, the number of bit errors ($N_2$) found in step 206 are stored in a second memory location associated with the digital signal processor. At step 210, the performance gauge 32 determines whether or not the number of bit errors ($N_1$) found for the first path are less than or equal to the number of bit errors ($N_2$) found for the second path 18. If so, at step 212, the performance gauge 32 outputs control information for switch 34 to select the first path 16 as an output to the speech decoder 36. The first path selected is optimized for non-time-dispersive radio signals. Otherwise, at step 214, the performance gauge 32 outputs control information for switch 34 to select the second path 18 as an output to the speech decoder 36. The second path selected is optimized for time-dispersive radio signals.

Figure 4:
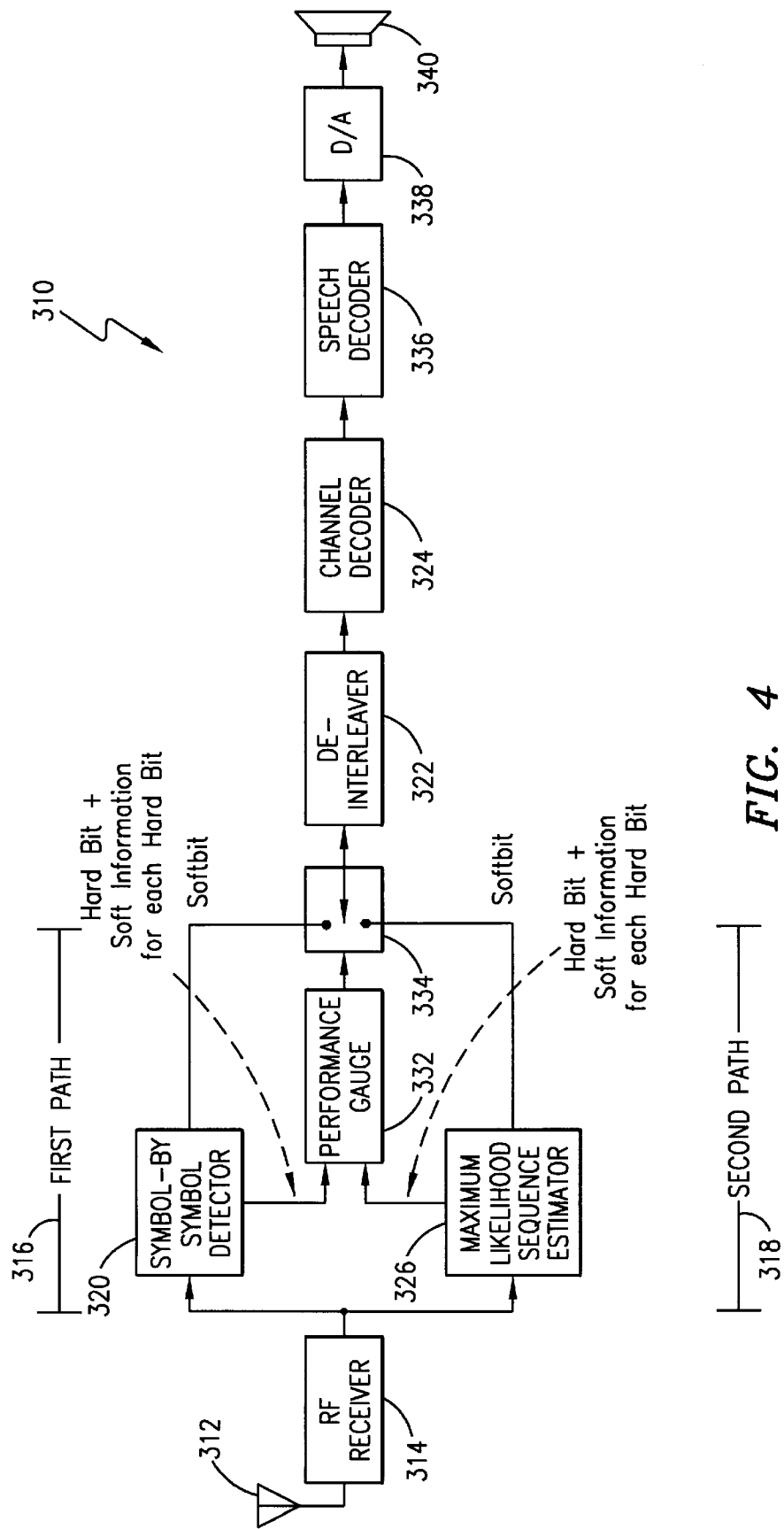
FIG. 4 is a block diagram of a receiver that includes a multi-path demodulator, which can be used to implement a third embodiment of the present invention.

FIG. 4 is a block diagram of a receiver that includes a multi-path demodulator, which can be used to implement a third embodiment of the present invention. In FIG. 4, a receiver 310 including a dual-path demodulator is shown. Again, this description is for illustrative purposes only and it should be understood that the invention can also cover a demodulator with more than two parallel demodulation paths. Preferably, receiver 310 is a digital or analog/digital mobile terminal receiver that includes a conventional antenna 312 and RF receiver front end section 314. In this embodiment, the preferable modulation scheme used is a non-constant envelope DQPSK modulation scheme, as it is implemented in the DAMPS or the Pacific Digital Cellular (PDC) System in Japan. The invention can also be implemented in the GSM, which uses a constant envelope GMSK modulation scheme.

An output of the RF receiver front end section 314 is coupled to a respective input of a pair of parallel demodulation channels, shown as a first demodulation path 316 and second demodulation path 318. Generally, the first demodulation path 316 can include a symbol-by-symbol detector 320. In this exemplary embodiment, detector 320 is preferably a differential detector.

The second demodulation path 318 includes an MLSE 326. The MLSE 326 is an equalizer that uses a channel impulse response simulator to test all possible data sequences. The output of the MLSE 326 provides the data sequence with the maximum probability. In this embodiment, MLSE 326 is preferably a Viterbi equalizer.

A first output of detector 320 is coupled to a first input of performance gauge 332. A first output of MLSE 326 is coupled to a second input of performance gauge 332. Similar to the performance gauge 32 shown in FIG. 1, the performance gauge 332 functions to measure and compare the efficiencies of the demodulation processes of paths 316 and 318. Performance gauge 332 selects the best demodulation bit stream to use (e.g., first path 16 or second path 18) for the particular channel conditions present at the time. An output of performance gauge 332 is coupled to a control input of switch 334 (e.g., an electronic switch or software switching function). A second output of detector 320 is coupled to a second input of switch 334, and a second output of MLSE 326 is coupled to a third input of switch 334. The performance gauge 32 selects the most efficient bit stream from first path 316 or second path 318 as an output from the switch 334, which routes the selected output bit stream to the de-interleaver 322. Preferably, the efficiency measurement used for the performance gauge selection is computed for a specific time interval (e.g., a time division multiple access or TDMA slot for a mobile telephone). The output of switch 334 is coupled to an input of the de-interleaver 322. The output of de-interleaver 322 is coupled to an input of a channel decoder 324. In this embodiment, channel decoder 324 is preferably a convolutional decoder with an error correction capability. An output of channel decoder 324 is coupled to an input of a speech decoder 336 (or to a visual display for data). The digital speech information (bit stream) is converted to an analog signal (338) and output via a speaker 340.

Figure 5:
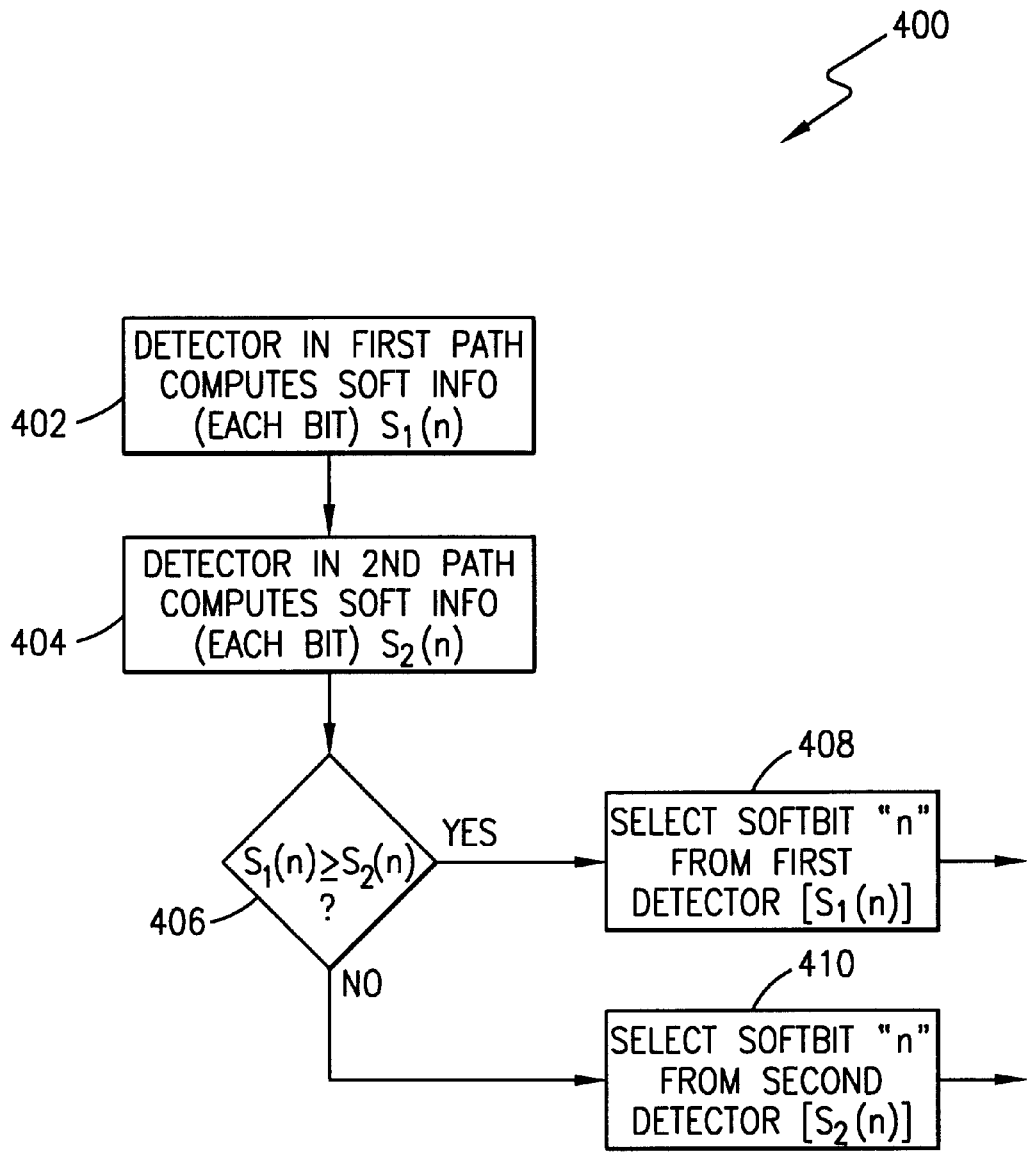
FIG. 5 is a flow chart that illustrates a preferred criteria and method of selecting demodulated bits, which can be implemented by the performance gauge shown in FIG. 4.

FIG. 5 is a flow chart that illustrates a preferred criteria and method of selecting demodulated bits, which can be implemented by the performance gauge 332 shown in FIG. 4. Essentially, for this embodiment, the output of the performance gauge 332 functions to control switch 334, which responsively selects a "soft bit" from either the first path 316 or the second path 318, and routes the selected "soft bit" to the input of the de-interleaver 322. Each such "soft bit" comprises a "hard bit" plus "soft" information (e.g., data indicating the reliability or confidence level of the associated "hard bit" output decision made by detector 320 or MLSE 326). The performance gauge 332 utilizes the magnitude of the "soft" information for each detected "hard bit" from the detector 320 and MLSE 326 to determine which "soft bit" to select and route to the de-interleaver 322 (through switch 334). The "soft bit" for each detected "hard bit" can be computed by one of a number of known ways, such as, for example, use of the phase error between the received symbol and output (decision result) symbol from detector 320, use of the received signal strength (RSS) of the received symbol, or use of metrics obtained by the MLSE 326.

For example, if (at one instant) the performance gauge 332 determines that the magnitude of the "soft" information from MLSE 326 is higher than the magnitude of the "soft" information from detector 320, then the performance gauge 332 outputs a control signal to switch 334, which directs switch 334 to route the "soft bit" from MLSE 326 associated with that higher magnitude "soft" information to de-interleaver 322. In other words, each "soft bit" to be further processed (of the total number of "soft bits" per "frame" or time slot) can be selected from either the detector 320 or MLSE 326, based on the magnitude of the "soft information" provided by each of those devices. Consequently, in this embodiment, the best demodulation path (of two paths in this case) can be selected by utilizing the detector 320 and MLSE 326, without utilizing the de-interleaver or channel decoder as described for the first and second embodiments. Notably, in FIG. 4, the use of the detector 320 and MLSE 326 for best path selection significantly reduces the processing load for the digital signal processor used, in comparison with the first and second embodiments.

In operation, referring to FIGS. 4 and 5, at step 402 of method 400, detector 320 (in first demodulation path 316) calculates "soft" information data for each detected "hard bit" (represented by $S_1(n)$). For this embodiment, there are n "soft bits" per "frame" or time slot. At step 404, MLSE 326 (the "detector" in second demodulation path 318) calculates "soft" information data for each detected "hard bit" (represented by $S_2(n)$). At step 406, performance gauge 332 determines whether or not the magnitude of the "soft" information per bit ($S_1(n)$) from the first demodulation path 316 is greater than or equal to the magnitude of the "soft"

information ($S_2(n)$) from the second demodulation path 318. If so, at step 408, performance gauge 332 outputs a control signal to switch 334, which enables switch 334 to route that particular "soft bit" n from the first detector 320 (i.e., $S_1(n)$) to the de-interleaver 322 for further processing. The first path (316) thus selected for further processing is optimized for non-time-dispersive radio signals. Otherwise, at step 410, performance gauge 332 outputs a control signal to switch 334, which enables switch 334 to route that particular "soft bit" n from the second "detector" or MLSE 326 (i.e., $S_2(n)$) to the de-interleaver 322 for further processing. The second path (318) thus selected for further processing is optimized for time-dispersive radio signals.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A demodulator for demodulating received signals, comprising:
   a symbol-by-symbol detector having an output coupled to a first channel decoder for performing error corrections;
   a sequence estimator having an output coupled to a second channel decoder for performing error corrections; and
   performance gauging means coupled to said first channel decoder and said second channel decoder, for comparing the number of error corrections performed by said first channel decoder and said second channel decoder and selecting an output from one of said first channel decoder and said second channel decoder based on the number of error corrections performed.

2. The demodulator of claim 1, wherein said symbol-by-symbol detector comprises a differential detector.

3. The demodulator of claim 1, wherein said sequence estimator comprises a maximum likelihood sequence estimator.

4. The demodulator of claim 1, wherein said sequence estimator comprises an adaptive equalizer.

5. The demodulator of claim 1, wherein said sequence estimator comprises a Viterbi equalizer.

6. The demodulator of claim 1, further comprising a dual-path demodulator.

7. The demodulator of claim 1, wherein said sequence estimator, symbol-by-symbol detector, and said performance gauging means comprise a digital signal processor.

8. The demodulator of claim 1, further comprising switching means for selecting said output from at least one of said first channel decoder and said second channel decoder, responsive to said performance gauging means.

9. A demodulator for demodulating a received signal, comprising:
   a first detector for detecting the received signal based on a first detection procedure, wherein said first detection procedure is optimized for non-time-dispersive radio signals;
   a first deinterleaver for receiving an output of said first detector;
   a second detector for detecting the received signal based on a second detection procedure;
   a second deinterleaver for receiving an output of said second detector; and
   a performance gauge for assessing performance of said first detection procedure and said second detection procedure and selecting an output signal from one of said first detector and said second detector for demodulating the received signal based on said assessed performances.

10. The demodulator of claim 9, wherein said first detector comprises a differential detector.

11. The demodulator of claim 9, wherein said second detector comprises a maximum likelihood sequence estimator.

12. The demodulator of claim 9, wherein said second detector comprises an adaptive equalizer.

13. The demodulator of claim 9, wherein said second detector comprises a Viterbi equalizer.

14. The demodulator of claim 9, further comprising a dual-path demodulator.

15. The demodulator of claim 9, wherein said first detector, second detector, and said performance gauge comprise a digital signal processor.

16. The demodulator of claim 9, further comprising switching means for selecting said output signal from one of said first detector and said second detector.

17. The demodulator of claim 9, wherein said second detection procedure is optimized for time-dispersive radio signals.

18. A method for demodulating digital signals, comprising the steps of:
   performing a symbol-by-symbol detection of a received digital signal;
   performing a maximum likelihood sequence estimation for said received digital signal;
   channel decoding said detection and said estimation of said received digital signal; and
   selecting as an output one of said channel decoding of said detection of said received digital signal and said channel decoding of said estimation of said received signal based on a result of said performing and channel decoding steps.

19. The method of claim 18, wherein said step of performing said symbol-by-symbol detection of said received digital signal is performed by a differential detector.

20. The method of claim 18, wherein said step of performing said maximum likelihood sequence estimation for said received digital signal is performed by an adaptive equalizer.

21. The method of claim 18, wherein said step of performing said maximum likelihood sequence estimation for said received digital signal is performed by a Viterbi equalizer.

22. The method of claim 18, further comprising the steps of:
   computing a first cyclic redundancy check for said decoding of said detection of said received digital signal;
   computing a second cyclic redundancy check for said decoding of said estimation of said received digital signal; and
   selecting as said output said decoding of said detection of said received digital signal if said first cyclic redundancy check is correct, and selecting as said output said decoding of said estimation of said received digital signal if said second cyclic redundancy check is correct.

23. A method for use in demodulating radio signals in a mobile radiotelephone, comprising the steps of:
   performing a symbol-by-symbol detection of a received digital signal;

performing a maximum likelihood sequence estimation for said received digital signal;

decoding said detection and said estimation of said received digital signal;

correcting a first plurality of bit errors in said decoding of said detection of said received digital signal;

correcting a second plurality of bit errors in said decoding of said estimation of said received digital signal; and selecting as an output said decoding of said detection of said received digital signal if an amount of said first plurality of bit errors is less than or equal to an amount of said second plurality of bit errors, and selecting as said output said decoding of said estimation of said received signal if said amount of said first plurality of bit errors is greater than said amount of said second plurality of bit errors.

24. A method for use in demodulating radio signals in a mobile radiotelephone, comprising the steps of:

a first detector detecting a first hard bit in a received digital signal;

a second detector detecting a second hard bit in said received digital signal said first detector and said second detector being different types of detectors;

computing first soft information data for said first hard bit;

computing second soft information data for said second hard bit; and selecting for demodulation a first soft bit associated with said first soft information data if a value of said first soft information data is greater than or equal to a value of said second soft information data, and selecting for demodulation a second soft bit associated with said second soft information data if said value of said first soft information data is less than said value of said second soft information data.

25. The method of claim 24, wherein said first detector comprises a symbol-by-symbol detector.

26. The method of claim 24, wherein said second detector comprises a maximum likelihood sequence estimator.

27. The method of claim 24, wherein at least one detector comprises an adaptive equalizer.

28. The method of claim 24, wherein at least one detector comprises a differential detector.

29. The method of claim 24, wherein at least one detector comprises a Viterbi equalizer.

30. The method of claim 24, wherein said value of said first soft information data comprises a first magnitude, and said value of said second soft information data comprises a second magnitude.

* * * * *